(12) United States Patent
Hüffer et al.

(10) Patent No.: US 6,200,922 B1
(45) Date of Patent: *Mar. 13, 2001

(54) CATALYST SYSTEMS OF THE ZIEGLER-NATTA TYPE

(75) Inventors: Stephan Hüffer, Ludwigshafen; Wolfgang Bidell, Mutterstadt; Patrik Müller, Kaiserslautern; Ulrich Moll, St Martin; Roland Hingmann, Ladenburg; Günther Schweier, Friedelsheim, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/869,761

(22) Filed: Jun. 5, 1997

(30) Foreign Application Priority Data

Jun. 11, 1996 (DE) .............................. 196 23 226

(51) Int. Cl.[7] ..................................... B01J 21/06
(52) U.S. Cl. .................. 502/120; 502/113; 502/127; 526/107; 526/129; 526/158; 526/348
(58) Field of Search ................... 502/113, 120, 502/127; 526/107, 129, 158, 348

(56) References Cited

U.S. PATENT DOCUMENTS

| | | |
|---|---|---|
| 4,857,613 | 8/1989 | Zolk et al. . |
| 5,288,824 | 2/1994 | Kerth et al. . |
| 5,296,431 * | 3/1994 | Hungenberg et al. ............ 526/124.6 |
| 5,330,949 * | 7/1994 | Funabashi et al. ............... 526/124.6 |

FOREIGN PATENT DOCUMENTS

| | | |
|---|---|---|
| 19529240 | 2/1997 | (DE) . |
| 014 523 | 8/1980 | (EP) . |
| 023 425 | 2/1981 | (EP) . |
| 34303 * | 8/1981 | (EP) . |
| 034 303 | 8/1981 | (EP) . |
| 045 977 | 2/1982 | (EP) . |
| 086 473 | 8/1983 | (EP) . |
| 171 200 | 2/1986 | (EP) . |
| 243 165 | 10/1987 | (EP) . |
| 243165 * | 10/1987 | (EP) . |
| 045 975 | 4/1989 | (EP) . |
| 195 497 | 7/1989 | (EP) . |
| 2001043 | 1/1979 | (GB) . |
| 2111066 | 6/1983 | (GB) . |
| 2293314 | 12/1990 | (JP) . |
| WO96/05236 * | 2/1996 | (WO) . |
| 96/05236 | 2/1996 | (WO) . |

* cited by examiner

*Primary Examiner*—David W. Wu
*Assistant Examiner*—Ling-Siu Choi
(74) *Attorney, Agent, or Firm*—Keil & Weinkauf

(57) ABSTRACT

The catalyst systems comprise as active constituents a) a titanium-containing solid component comprising a compound of titanium, a compound of magnesium, a halogen, an inorganic oxide as support and a carboxylic ester as electron donor compound, and also, as cocatalyst, b) an aluminum compound and c) optionally a further electron donor compound, wherein the inorganic oxide used has a pH of from 1 to 6, an average particle diameter of from 5 to 200 $\mu$m, an average primary particle diameter of from 1 to 20 $\mu$M and voids or channels having an average diameter of from 0.1 to 20 $\mu$m and a macroscopic share of the volume of the overall particle within the range from 5 to 30%.

9 Claims, No Drawings

CATALYST SYSTEMS OF THE ZIEGLER-NATTA TYPE

DESCRIPTION

The present invention relates to catalyst systems of the Ziegler-Natta type, comprising as active constituents a) a titanium-containing solid component comprising a compound of titanium, a compound of magnesium, a halogen, an inorganic oxide as support and a carboxylic ester as electron donor compound, and also, as cocatalyst, b) an aluminum compound and c) optionally a further electron donor compound, wherein the inorganic oxide used has a pH of from 1 to 6, an average particle diameter of from 5 to 200 $\mu$m, an average primary particle diameter of from 1 to 20 $\mu$m and voids or channels having an average diameter of from 0.1 to 20 $\mu$m and a macroscopic share of the volume of the overall particle within the range from 5 to 30%.

The present invention also relates to a process for producing such Ziegler-Natta catalyst systems, to the production of polymers of propylene with the aid of these catalyst systems, to the polymers thus obtainable, and to films, fibers and moldings composed of these polymers.

Catalyst systems of the Ziegler-Natta type are known inter alia from EP-B 014523, EP-A 023425, EP-A 045975 and EP-A 195497. These systems are used in particular for the polymerization of $C_2$–$C_{10}$-alk-1-enes and comprise inter alia compounds of polyvalent titanium, aluminum halides and/or alkyls, and also electron donor compounds, especially silicon compounds, ethers, carboxylic esters, ketones and lactones, used on -the one hand in conjunction with the titanium component and, on the other hand, as cocatalyst.

Ziegler-Natta catalysts are usually produced in two steps. First the titanium-containing solid component is produced. It is then reacted with the cocatalyst. The thus-obtained catalyst is then used to carry out the polymerization.

Furthermore, U.S. Pat. No. 4,857,613 and U.S. Pat. No. 5,288,824 describe catalyst systems of the Ziegler-Natta type which, as well as a titanium-containing solid component and an aluminum compound, comprise organic silane compounds as external electron donor compounds. The catalyst systems in question are notable inter alia for good productivity and yield polymers of propylene having high stereospecificity, i.e.-high isotacticity, a low chlorine content and good morphology, viz. a low proportion of fines.

Propylene polymers obtained with the aid of the catalyst systems described in U.S. Pat. No. 4,857,613 and U.S. Pat. No. 5,288,824 still have certain proportions of xylene and heptane solubles, which is disadvantageous for some applications, for example in the food sector or in the hygiene sector.

It is an object of the present invention to develop, on the basis of the catalyst systems described in U.S. Pat. No. 4,857,613 and U.S. Pat. No. 5,288,824, an improved catalyst system of the Ziegler-Natta type which does not have the abovementioned disadvantages in respect of the presence of xylene and heptane solubles and which, what is more, shall be notable for the high production and stereospecificity of the polymers obtained.

We have found that this object is achieved by the initially defined catalyst systems of the Ziegler-Natta type.

The catalyst systems of this invention, as well as a titanium-containing solid component a), further comprise a cocatalyst. The cocatalyst may be an aluminum compound b). Preferably, the cocatalyst, as well as this aluminum compound b), additionally comprises an electron donor compound c) as further constituent.

The titanium-containing solid component a) is typically produced using halides or alkoxides of ter- or tetravalent titanium, preferably the chlorides of titanium, especially titanium tetrachloride. The titanium-containing solid component further comprises a support.

In addition, the titanium-containing solid component is produced using, inter alia, compounds of magnesium. Suitable magnesium compounds for this purpose include in particular magnesium halides, magnesium alkyls and magnesium aryls and also magnesium alkoxy and magnesium aryloxy compounds, of which magnesium dichloride, magnesium dibromide and magnesium di($C_1$–$C_{10}$-alkyl) compounds are preferred. In addition, the titanium-containing solid component can further contain halogen, preferably chlorine or bromine.

The titanium-containing solid component a) further comprises electron donor compounds, for example mono- or polyfunctional carboxylic acids, carboxylic anhydrides and carboxylic esters, also ketones, ethers, alcohols, lactones and also organophosphorus and organosilicon compounds. Preferred electron donor compounds for inclusion in the titanium-containing solid component are phthalic acid derivatives of the general formula (II)

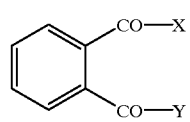

(II)

where X and Y each represent a chlorine atom or a $C_1$–$C_{10}$-alkoxy radical or together represent oxygen. Particularly preferred electron donor compounds are phthalic esters in which X and Y are each $C_1$–$C_8$-alkoxy, for example methoxy, ethoxy, propyloxy or butyloxy.

Further preferred electron donor compounds for inclusion in the titanium-containing solid component include diesters of 3- or 4-membered, substituted or unsubstituted cycloalkyl-1,2-dicarboxylic acids and also monoesters of substituted or unsubstituted -benzophenone-2-carboxylic acids. The hydroxy compounds used for these esters are the alcohols which are customarily used in esterification reactions, for example $C_1$–$C_{15}$-alkanols, $C_5$–$C_7$-cycloalkanols which may in turn bear $C_1$–$C_{10}$-alkyl groups, and also $C_6$–$C_{10}$-phenols.

The titanium-containing solid component can be produced by methods known per se. Examples thereof are described inter alia in EP-A 45 975, EP-A 45 977, EP-A 86 473, EP-A 171 200, GB-A 2 111 066, U.S. Pat. No. 4,857,613 and U.S. Pat. No. 5,288,824.

The titanium-containing solid component a) is preferably produced using the following two-stage process:

In the first stage, an inorganic oxide, which generally has a pH of from 1 to 6, an average particle diameter of from 5 to 200 $\mu$m, especially of from 20 to 70 $\mu$m, a pore volume of from 0.1 to 10 cm$^3$/g, especially of from 1.0 to 4.0 cm$^3$/g, and a specific surface area of from 10 to 1000 m$^2$/g, especially of from 100 to 500 m$^2$/g, is admixed with a solution of the magnesium-containing compound in a liquid alkane, and the mixture is stirred at from 10 to 120° C. for from 0.5 to 5 hours. From 0.1 to 1 mol of the magnesium compound is preferably used per mole of the support. Subsequently, while the mixture is stirred continuously, a halogen or a hydrogen halide, especially chlorine or hydrogen chloride, is added in an at least twofold, preferably at least fivefold, molar excess, based on the magnesium-containing compound. After from about 30 to 120 minutes, this reaction product is admixed at from 10 to 150° C. with a $C_1$–$C_8$-alkanol, especially ethanol, a halide or an alkoxide of the ter- or tetravalent titanium, especially titanium tetrachloride, and also with an electron donor compound. The amounts used are, per mole of magnesium in the solid obtained in the first step, from 1 to 5 mol of the ter- or tetravalent titanium and from 0.01 to 1 mol, especially from 0.1 to 0.5 mol, of the electron donor compound. This mixture is stirred at from 10 to 150° C. for at least 30 minutes, and the resulting solid substance is subsequently filtered off and washed with a $C_7$–$C_{10}$-alkylbenzene, preferably with ethylbenzene.

In the second stage, the solid obtained from the first stage is extracted for some hours at from 100 to 150° C. with excess titanium tetrachloride or an excess solution of titanium tetrachloride in an inert solvent, preferably an alkylbenzene, in which case the solvent comprises at least 5% by weight of titanium tetrachloride. The product is then washed with a liquid alkane until the titanium tetrachloride content of the wash liquor is less than 2% by weight.

The titanium-containing solid component obtainable in this way is combined with a cocatalyst to form a Ziegler-Natta catalyst system. The cocatalyst used includes an aluminum compound b).

Aluminum compounds b) suitable for use as cocatalysts are trialkylaluminums and trialkylaluminum compounds where one alkyl group has been replaced by an alkoxy group or by a halogen atom, for example by chlorine or bromine. Preference is given to using trialkylaluminum compounds whose alkyl groups each have from 1 to 8 carbon atoms, for example trimethylaluminum, triethylaluminum or methyldiethylaluminum.

As well as said aluminum compound b), the cocatalyst further comprises an electron donor compound c), for example mono- or polyfunctional carboxylic acids, carboxylic anhydrides and carboxylic esters, also ketones, ethers, alcohols, lactones and also organophosphorus and organosilicon compounds. Preferred electron donor compounds are organosilicon compounds of the general formula (I)

$$R^1_n Si(OR^2)_{4-n} \qquad (I)$$

where $R^1$ is identical or different and represents $C_1$–$C_{20}$-alkyl, 5-, 6-or 7-membered cycloalkyl with or without $C_1$–$C_{10}$-alkyl attached to it, or $C_6$–$C_{20}$-aryl or -arylalkyl, $R^2$ is identical or different and represents $C_1$–$C_{20}$-alkyl, and n is 1, 2 or 3. Particular preference is given in this context to those compounds in which $R^1$ is $C_1$–$C_8$-alkyl or 5-, 6- or 7-membered cycloalkyl, $R^2$ is $C_1$–$C_4$-alkyl, and n is 1 or 2.

Among these compounds, particular emphasis is given to dimethoxydiisopropylsilane, dimethoxyisobutylisopropylsilane, dimethoxydiisobutylsilane, dimethoxydicyclopentylsilane, dimethoxyisobutyl-sec.butylsilane, dimethoxyisopropylsec.butylsilane, diethoxydicyclopentylsilane and diethoxyisobutylisopropylsilane.

The individual compounds b) and optionally c) can be used as cocatalyst in any order, either individually or as a mixture of two components.

According to the present invention, the titanium-containing solid component a) comprises a finely divided inorganic oxide having a pH of from 1 to 6, an average particle diameter of from 5 to 200 μm, especially of from 20 to 70 μm, and an average primary particle diameter of from 1 to 20 μm, especially of from 1 to 5 μm. Primary particles are porous, granular oxide particles obtained by grinding, with or without previous sieving, from a corresponding hydrogel. The hydrogel in question is produced within the acidic range, i.e. within a range having a pH within the range from 1 to 6, or else aftertreated with appropriately acidic wash liquors for the purpose of purification.

Furthermore, the finely divided inorganic oxide to be used according to this invention also has voids or channels having an average diameter of from 0.1 to 20 μm, in particular of from 1 to 15 μm, and a macroscopic share of the volume of the overall particle within the range from 5 to 30 %, in particular within the range from 10 to 30%. The finely divided inorganic oxide further has in particular a pore volume of from 0.1 to 10 cm$^3$/g, preferably of from 1.0 to 4.0 cm$^3$/g, and a specific surface area of from 10 to 1000 m$^2$/g, preferably of from 100 to 500 m$^2$/g. The pH, i.e. the negative decadic logarithm of the proton concentration of the inorganic oxide, is within the range from 1 to 6, especially within the range from 2 to 5.

Preferred inorganic oxides are in particular oxides of silicon, of aluminum, of titanium or of a metal of main group I or II of the Periodic Table. Very particularly preferred oxides include not only aluminum oxide or magnesium oxide or a sheet-silicate but also silica gel (SiO$_2$), especially silica gel obtainable by spray drying. It is also possible to use cogels, i.e. mixtures of two different inorganic oxides.

Owing to the voids or channels present in the finely divided inorganic oxide, there is a significantly improved distribution of the catalytically active components in the support material. The acidic centers on the oxide surface additionally bring about a more homogeneous loading with the catalyst constituents, in particular with the magnesium compound. In addition, a material pervaded in this way by voids and channels has a positive effect on the diffusion-controlled supply of monomers and cocatalysts and thus also on the polymerization kinetics. Such a finely divided inorganic oxide is obtainable inter alia by spray drying ground, appropriately sieved hydrogel, which for this purpose is slurried up with water or an aliphatic alcohol. During the spray drying, the requisite pH of from 1 to 6 can also be obtained by using appropriately acidic primary particle suspensions. Such a finely divided inorganic oxide, however, is also commercially available.

The inorganic oxide is preferably present within the titanium-containing solid component a) in such amounts that for every mole of the inorganic oxide there is from 0.1 to 1.0 mol, especially from 0.2 to 0.5 mol, of the compound of magnesium.

The cocatalytically active compounds b) and optionally c) can be made to act on the titanium-containing solid component a) not only in succession but also together. This is usually done at from 0 to 150° C., especially at from 20 to 90° C., and from 1 to 100 bar, especially from 1 to 40 bar.

The cocatalysts b) and optionally c) are preferably used in such an amount that the atomic ratio between aluminum in the aluminum compound and titanium in the titanium-containing solid component a) is within the range from 10:1 to 800:1, especially within the range from 20:1 to 200:1, and the molar ratio between the aluminum compound and the cocatalyst electron donor compound c) is within the range from 1:1 to 250:1, especially within the range from 10:1 to 80:1.

The catalyst systems of this invention are used for producing polymers of $C_2$–$C_{10}$-alk-1-enes. They are particularly highly suitable for producing polymers of propylene and of ethylene, i.e. ethylene homopolymers, propylene homopolymers, and copolymers of ethylene and propylene with other $C_2$–$C_{10}$-alk-1-enes. The propylene and/or ethylene monomer content of these copolymers shall be at least 50 mol %.

Herein the designation $C_2$–$C_{10}$-alk-1-enes includes inter alia ethylene, propylene, 1-butene, 1-pentene, 1-hexene, 1-heptene and 1-octene, of which ethylene, propylene and 1-butene are particularly preferred.

However, the catalyst systems of this invention can also be used for producing polymers of other $C_2$–$C_{10}$-alk-1-enes, for example for producing homo- or copolymers of 1-butene, of 1-pentene, of 1-hexene, of 1-heptene or of 1-octene.

The catalyst system of this invention is preferably used to produce polymers containing from 50 to 100 mol % of propylene, from 0 to 50 mol %, especially from 0 to 30 mol %, of ethylene and from 0 to 20 mol %, especially from 0 to 10 mol %, of $C_4$–$C_{10}$-alk-1-enes. The mol%ages always add up to 100.

The production of such polymers of $C_2$–$C_{10}$-alk-1-enes can be carried out in the customary reactors used for the polymerization of $C_2$–$C_{10}$-alk-1-enes, either batchwise or preferably continuously, for example as a suspension polymerization or preferably as a gas-phase polymerization. Suitable reactors include continuously stirred reactors which contain a solid bed of finely divided polymer which is customarily kept in agitation by suitable stirring means. Of course, the reaction can also be carried out in a plurality of reactors connected in series (reactor cascade). The reaction time depends crucially on the particular reaction conditions used. It is customarily within the range from 0.2 to 20 hours, typically within the range from 0.5 to 10 hours.

The polymerization reaction is advantageously carried out at from 20 to 150° C. and from 1 to 100 bar. Preference is given to temperatures of from 40 to 100° C. and pressures of from 10 to 50 bar. The molar mass of the resulting polyalk-1-enes can be controlled, and adjusted over a wide range, by addition of regulators customary in polymerization technology, for example hydrogen. It is further possible to use inert solvents such as, for example, toluene or hexane, an inert gas such as nitrogen or argon and minor amounts of polypropylene powder.

The propylene homopolymers and copolymers obtained by means of the catalyst system of this invention are obtainable in the molar masses customary for polyalk-l-enes, preference being given to polymers having weight average molar masses within the range from 20,000 to 500,000. Their melt flow indices, at 230° C. and a load of 2.16 kg, in accordance with DIN 53 735 are within the range from 0.1 to 100 g/10 min, in particular within the range from 0.5 to 50 g/10 min.

The catalyst system of this invention, compared with existing catalyst systems, is notable for very high productivity and improved stereospecificity, in particular in gas-phase polymerizations. The polymers obtainable in this way are also notable for a high bulk density, reduced xylene solubles and a low residual chlorine content. Furthermore, the heptane solubles content of the polymer is reduced.

Owing to their good mechanical properties, the propylene polymers produced using the catalyst system of this invention are especially suitable for producing films, fibers and moldings.

EXAMPLES

Comparative Example A a) Production of the Titanium-Containing Solid Component (1)

In a first stage, finely divided silica gel ($SiO_2$) having a particle diameter of from 20 to 45 μm, a pore volume of 1.5 cm³/g and a specific surface area of 260 m²/g was admixed with a solution of n-butyloctylmagnesium in n-heptane in a proportion of 0.3 mol of the magnesium compound per mole of $SiO_2$. The finely divided silica gel was additionally characterized by a pH of 7.0, an average primary-particle size of 3–5 μm and by voids and channels having a diameter of 3–5 μm and a macroscopic share of the volume of the overall particle of about 15 %. The solution was stirred at 95° C. for 30 minutes and then cooled down to 20° C., at which point 10 times the molar amount, based on the organomagnesium compound, of hydrogen chloride was introduced. After 60 minutes, the reaction product was admixed with 3 mol of ethanol per mole of magnesium under constant stirring. This mixture was stirred at 80° C. for 0.5 hours and then admixed with 7.2 mol of titanium tetrachloride and 0.5 mol of di-n-butyl phthalate, each based on 1 mol of magnesium. The batch was subsequently stirred at 100° C. for 1 hour, and the resulting solid was filtered off and repeatedly washed with ethylbenzene.

The resulting solid product was extracted at 125° C. with a 10 % strength by volume solution of titanium tetrachloride in ethylbenzene for 3 hours. The solid product was then filtered off the extractant and washed with n-heptane until the extractant had a titanium tetrachloride content of just 0.3 %.

The titanium-containing solid component comprised 3.5% by weight of Ti 7.4 % by weight of Mg 28.2 % by weight of Cl.

The particle diameter was determined by Coulter Counter analysis (particle size distribution of the silica gel particles), the pore volume and the specific surface area by nitrogen adsorption in accordance with DIN 66131 or by mercury porosimetry in accordance with DIN 66133. The average size of the primary particles, the diameter of the voids and channels and their macroscopic share of the volume were determined with the aid of scanning electron microscopy or electron probe microanalysis, in each case on particle surfaces and on particle cross sections of the silica gel. The pH of the silica gel was determined by means of the method described in S. R. Morrison, The Chemical Physics of Surfaces, Plenum Press, New York [1977], pages 130 and 131.

b) Polymerization of Propylene

The polymerization was carried out in the gas phase in a stirred autoclave reactor having a useful capacity of 10 l in the presence of hydrogen as molecular weight regulator.

Gaseous propylene was passed into the gas phase reactor at 28 bar and 70° C. in the presence of 8 liters of hydrogen. A polymerization was carried out by means of the titanium-containing solid component a) described in Example 1 a using a residence time of 1.5 hours and using 100 mg of the titanium-containing solid component a), 10 mmol of triethylaluminum and 1 mmol of dimethoxyisobutylisopropylsilane as cocatalyst.

After the gas-phase polymerization had ended, the propylene homopolymer obtained had a melt flow index of 12.2 g/10 min, at 230° C. and 2.16 kg (in accordance with DIN 53 735).

Representative Example 1

Comparative Example A was repeated, except that the titanium-containing solid component a) used had been obtained on the basis of an acidic silica gel having a pH of 3.5 and a 15 % macroscopic volume share for the voids and channels within the overall particle.

The granular silica gel had the following properties:
Primary particle size: 3–5 μm
Particle diameter: 20–45 μm
Pore volume: 1.5 cm³/g
Specific surface area: 325 m²/g
Proportion of voids and channels in overall particle: 15 %
The titanium-containing solid component comprised:
3.4% by weight of Ti
7.5 % by weight of Mg
28.0 % by weight of Cl Representative Example 2

Comparative Example A was repeated, except that the titanium-containing solid component a) used had been obtained on the basis of an acidic silica gel having a pH of 3.5 and a 25 % macroscopic volume share for the voids and channels within the overall particle.

The granular silica gel had the following properties:
Primary particle size: 3–5 μm
Particle diameter: 20–45 μm
Pore volume: 1.6 cm³/g
Specific surface area: 320 m²/g
Proportion of voids and channels in overall particle: 25%
The titanium-containing solid component comprised:
3.6 % by weight of Ti
7.4 % by weight of Mg
28.4 % by weight of Cl Comparative Example B Comparative Example A was repeated, except that the titanium-containing solid component a) used had been obtained on the basis of a neutral silica gel having a pH of 7.0 and a 1% macroscopic volume share for the voids and channels within the overall particle.

The granular silica gel had the following properties:
Primary particle size: 3–5 μm
Particle diameter: 20–45 μm
Pore volume: 1.8 cm³/g
Specific surface area: 325 m²/g
Proportion of voids and channels in overall particle: <1%
The titanium-containing solid component comprised:
3.5% by weight of Ti
7.3 % by weight of Mg
28.0 % by weight of Cl The table below shows not only for Representative Examples 1 and 2 but also for Comparative Examples A and B the productivity of the catalyst system used as well as the following properties of the propylene homopolymers obtained in each case: xylene solubles (measure of the stereospecificity of the polymer), heptane solubles (measure of the stereospecificity of the polymer), chlorine content, bulk density, fines content (<0.125 mm) and melt flow index (to DIN 53735, at 230° C. and 2.16 kg). The table also specifies the proportion of voids and channels within the overall particle and the pH of the silica gel.

TABLE

|  | Comparative Example A | Representative Example 1 | Representative Example 2 | Comparative Example B |
|---|---|---|---|---|
| Productivity [g of polymer/g of titanium-containing solid component] | 20500 | 24700 | 27900 | 17600 |
| Xylene solubles [% by weight] | 0.9 | 0.7 | 0.6 | 1.3 |
| Heptane solubles [% by weight] | 1.9 | 1.3 | 1.0 | 2.9 |
| Chlorine content [ppm] | 12.0 | 11.0 | 11.4 | 13.9 |
| Bulk density [g/l] a) | 420 | 430 | 435 | 375 |
| Fines [% by weight] b) | 0.3 | 0.4 | 0.4 | 0.3 |
| Melt flow index [g/10 min] c) | 12.2 | 11.3 | 10.2 | 16.0 |
| Macroscopic volume share of voids and channels within the overall particle [%] | 15 | 15 | 25 | <1 |
| pH of silica gel | 7.0 | 3.5 | 3.5 | 7.0 | a) determined in accordance with DIN 53466
b) <0.125 mm, determined by sieve analysis
c) in accordance with DIN 53735, at 230° C. and 2.16 kg A comparison between Representative Examples 1 and 2 and Comparative Examples A and B makes it clear that the catalyst system of this invention has a higher productivity and leads to propylene polymers having an increased stereospecificity (lower xylene and heptane solubles), a reduced chlorine content and an increased bulk density.

We claim:

1. A Ziegler-Natta catalyst system, comprising an active constituents
   a) a titanium-containing solid component comprising a compound of titanium, a compound of magnesium, a halogen, an inorganic oxide as support and a carboxylic ester as electron donor compound,
   and also, as cocatalyst,
   b) an aluminum compound and
   c) optionally a further electron donor compound,
wherein the inorganic oxide itself used has a pH of from 2 to 6, an average particle diameter of from 5 to 200 μm, an average primary particle diameter of from 1 to 20 μm and voids or channels having an average diameter of from 0.1 to 20 μm, wherein the macroscopic volume share of said voids and channels within the overall particle is within the range from 5 to 30%.

2. Catalyst systems as claimed in claim 1, wherein the inorganic oxide used has voids and channels having an average diameter of from 1 to 5 μm, wherein the macroscopic volume share of said voids and channels within the overall particle within the range from 10 to 30%.

3. Catalyst systems as claimed in claim 1, wherein the inorganic oxide is an oxide of silicon, of aluminum, of titanium or of a metal of main group I or II of the Periodic Table.

4. Catalyst systems as claimed in claim 1, wherein the inorganic oxide used is spray-dried.

5. Catalyst systems as claimed in claim 1, wherein the inorganic oxide used has a pH of from 2 to 5.

6. Catalyst systems as claimed in claim 1, wherein the inorganic oxide used is silica gel ($SiO_2$).

7. Catalyst systems as claimed in claim 1, comprising a further electron donor compound c) comprising organosilicon compounds of the general formula (I)

$$R^1{}_n Si\,(OR^2)_{4-n} \quad (I)$$

where $R^1$ is identical or different and represents $C_1$–$C_{20}$-alkyl, 5-, 6- or 7-membered cycloalkyl with or without $C_1$–$C_{10}$-alkyl attached to it, or $C_6$–$C_{20}$-aryl or -arylalkyl, $R^2$ is identical or different and represents $C_1$–$C_{20}$-alkyl, and n is 1, 2 or 3.

8. Catalyst systems as claimed in claim 1, wherein said aluminum compound b) is a trialkylaluminum compound whose alkyl groups each have from 1 to 8 carbon atoms.

9. A process for producing catalyst systems as claimed in claim 1, which comprises combining said titanium-containing solid component a) and said cocatalyst b) and optionally c) at from 0 to 150° C. and from 1 to 100 bar.

* * * * *

UNITED STATES PATENT AND TRADEMARK OFFICE
CERTIFICATE OF CORRECTION

PATENT NO. : 6,200,922 B1  Page 1 of 1
DATED : March 13, 2001
INVENTOR(S) : Hüffer et al.

It is certified that error appears in the above-identified patent and that said Letters Patent is hereby corrected as shown below:

Column 8,

Claim 1,
Line 41, "an" should be -- as --.

Claim 2,
Line 61, after "particle" insert -- is --

Signed and Sealed this

Twenty-first Day of August, 2001

Attest:

NICHOLAS P. GODICI
Attesting Officer    Acting Director of the United States Patent and Trademark Office